US010174822B2

(12) United States Patent
Tsuchida et al.

(10) Patent No.: US 10,174,822 B2
(45) Date of Patent: Jan. 8, 2019

(54) HYDRAULIC CONTROL DEVICE FOR AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenichi Tsuchida, Nishio (JP); Toshiaki Hayashi, Toyohashi (JP); Masafumi Takasu, Okazaki (JP); Yuta Seriguchi, Anjo (JP); Masashi Takizawa, Anjo (JP); Takafumi Inagaki, Toyota (JP); Yoshinobu Soga, Toyota (JP); Syuji Moriyama, Nagakute (JP); Yoshihiro Mizuno, Nagoya (JP); Hiromitsu Nitani, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 15/322,006

(22) PCT Filed: Jul. 6, 2015

(86) PCT No.: PCT/JP2015/069385
§ 371 (c)(1),
(2) Date: Dec. 23, 2016

(87) PCT Pub. No.: WO2016/013389
PCT Pub. Date: Jan. 28, 2016

(65) Prior Publication Data
US 2017/0146104 A1 May 25, 2017

(30) Foreign Application Priority Data

Jul. 23, 2014 (JP) .................................. 2014-150021

(51) Int. Cl.
*F16H 37/06* (2006.01)
*F16H 61/00* (2006.01)
(Continued)

(52) U.S. Cl.
CPC ....... *F16H 37/0846* (2013.01); *F16H 37/022* (2013.01); *F16H 61/0021* (2013.01);
(Continued)

(58) Field of Classification Search
CPC ............... F16H 37/0846; F16H 37/022; F16H 61/0021; F16H 61/12; F16H 61/662
(Continued)

(56) References Cited

U.S. PATENT DOCUMENTS 5,063,815 A * 11/1991 Oshidari ............. F16H 37/0846
477/38
9,574,654 B2 * 2/2017 Lundberg ............ F16H 61/0021
(Continued)

FOREIGN PATENT DOCUMENTS

| CN | 1779295 A | 5/2006 |
| JP | 2010-203511 A | 9/2010 |

(Continued)

OTHER PUBLICATIONS

Sep. 29, 2015 International Search Report issued in International Patent Application No. PCT/JP2015/069385.

*Primary Examiner* — Ha Dinh Ho
(74) *Attorney, Agent, or Firm* — Oliff PLC

(57) ABSTRACT

A hydraulic control device for an automatic transmission where the spool is locked at the first position and the switching pressure can regulate the belt holding force of the primary pulley or the secondary pulley without switching a position of the spool when the engagement pressure is supplied to the second working oil chamber, and the spool is not locked at the first position and the switching pressure
(Continued)

can switch the spool to the second position against the urging member when the engagement pressure is not supplied to the second working oil chamber.

20 Claims, 7 Drawing Sheets

(51) Int. Cl.
  *F16H 61/12* (2010.01)
  *F16H 61/662* (2006.01)
  *F16H 37/08* (2006.01)
  *F16H 37/02* (2006.01)
  *F16H 61/70* (2006.01)

(52) U.S. Cl.
  CPC ....... *F16H 61/12* (2013.01); *F16H 61/66272* (2013.01); *F16H 61/702* (2013.01); *F16H 61/662* (2013.01); *F16H 2037/026* (2013.01); *F16H 2061/126* (2013.01); *F16H 2061/1252* (2013.01)

(58) Field of Classification Search
  USPC .......................................................... 74/745
  See application file for complete search history.

(56) References Cited

U.S. PATENT DOCUMENTS

| | | | |
|---|---|---|---|
| 9,702,450 B2* | 7/2017 | Singh | .................. F16H 57/0484 |
| 2005/0107195 A1* | 5/2005 | Katou | .................. F16H 63/065 |
| | | | 474/28 |
| 2006/0111207 A1 | 5/2006 | Ogata et al. | |

FOREIGN PATENT DOCUMENTS

| | | |
|---|---|---|
| JP | 2010-230097 A | 10/2010 |
| JP | 2011-196390 A | 10/2011 |
| JP | 2012-087896 A | 5/2012 |

* cited by examiner

FIG. 2

| TRAVEL DIRECTION | TRAVEL MODE | FIRST CLUTCH C1 | SECOND CLUTCH C2 | SYNCHRONIZATION MECHANISM S1 | FIRST BRAKE B1 |
|---|---|---|---|---|---|
| FORWARD | NON-CONTINUOUSLY-VARIABLE MODE | ◯ |  | ◯ |  |
|  | CONTINUOUSLY-VARIABLE MODE |  | ◯ | (◯) |  |
| REVERSE | NON-CONTINUOUSLY-VARIABLE MODE |  |  | ◯ | ◯ |

HYDRAULIC CONTROL DEVICE FOR AUTOMATIC TRANSMISSION

BACKGROUND

The present disclosure relates to a hydraulic control device for an automatic transmission that includes a continuously variable speed change mechanism to be mounted on a vehicle, for example.

Automatic transmissions that use a belt-type continuously variable speed change mechanism (hereinafter referred to as a "continuously variable speed change mechanism") that includes a pair of pulleys and a belt (or a chain) wound around the pulleys and made of metal and that continuously varies a speed by changing the effective diameters of the pulleys have been widespread as automatic transmissions that are suitable for use in vehicles, for example. The continuously variable speed change mechanism includes, as the pair of pulleys, a primary pulley configured to adjust a speed ratio and a secondary pulley configured to adjust a belt holding force.

Such automatic transmissions have linear solenoid valves configured to engage and disengage a plurality of engagement elements such as clutches and brakes provided in a power transfer path to switch a travel mode. As measures for a case where the linear solenoid valves are subjected to an off failure for some reason (hereinafter referred to as "at the time of an off failure"), there is occasionally provided a fail-safe valve configured to supply a source pressure such as a modulator pressure to engagement elements that are required as a minimum for the vehicle to travel forward, for example, at the time of an off failure.

There is known a hydraulic control device that utilizes a primary linear solenoid valve that supplies a primary control pressure for regulating a primary pressure to be supplied to a hydraulic servo for the primary pulley, for example, in order to switch the fail-safe valve at the time of an off failure (see Japanese Patent Application Publication No. 2011-196390). In the hydraulic control device, during normal times, the primary linear solenoid valve regulates the primary pressure utilizing a low-pressure region of the primary control pressure. At the time of an off failure, meanwhile, the primary linear solenoid valve regulates the primary pressure, concurrently with switching the fail-safe valve by supplying an engagement pressure, utilizing a high-pressure region of the primary control pressure.

SUMMARY

In the hydraulic control device described in Japanese Patent Application Publication No. 2011-196390, however, the fail-safe valve is switched using the high-pressure region of the primary control pressure as a signal pressure, and thus the high-pressure region of the primary control pressure cannot be used during normal times when an off failure has not occurred. Therefore, only the low-pressure region of the primary control pressure must be utilized to regulate the primary pressure utilizing the primary control pressure. Thus, there is a constraint on the rate of increasing the speed of increasing the primary pressure, which suppresses the speed change rate of the continuously variable speed change mechanism. In order to increase the speed change rate, it is conceivable to further increase the primary control pressure. However, that may increase the size of the primary linear solenoid valve. In order to increase the speed change rate, alternatively, it is conceivable to increase the primary pressure. However, that requires improving the pressure resistance of the valve body and a hydraulic servo for the primary pulley, which incurs an increase in size. In order to switch the fail-safe valve, in addition, it is also conceivable to use a secondary control pressure in place of the primary control pressure discussed above. However, that may cause the same problem as when the primary control pressure is utilized. Further, the same problem may also be caused for a switching valve other than the fail-safe valve.

An exemplary aspect of the disclosure provides a hydraulic control device for an automatic transmission in which a high-pressure region of a primary control pressure or a secondary control pressure can be used to regulate a primary pressure or a secondary pressure while using the primary control pressure or the secondary control pressure as a switching pressure (signal pressure) for a switching valve.

The present disclosure provides a hydraulic control device for an automatic transmission, including: an input shaft drivably coupled to a drive source of a vehicle; a driving shaft drivably coupled to wheels; a continuously variable speed change mechanism that has a primary pulley, a secondary pulley, and a belt held between the primary pulley and the secondary pulley and that is capable of continuously changing a speed ratio between the input shaft and the driving shaft by controlling pulley widths of the primary pulley and the secondary pulley; an engagement element provided in a power transfer path that couples the input shaft and the driving shaft via the continuously variable speed change mechanism; a primary solenoid valve that supplies a primary control pressure for regulating a belt holding force of the primary pulley of the continuously variable speed change mechanism; a secondary solenoid valve that supplies a secondary control pressure for regulating a belt holding force of the secondary pulley of the continuously variable speed change mechanism; a solenoid valve that supplies an engagement pressure for the engagement element; and a switching valve that has a spool that is switchable between a first position and a second position, an urging member that urges the spool toward the first position, a first working oil chamber that is supplied with a switching pressure, which is the primary control pressure or the secondary control pressure, to press the spool toward the second position, and a second working oil chamber that is supplied with the engagement pressure to press the spool toward the first position, wherein the spool is locked at the first position and the switching pressure can regulate the belt holding force of the primary pulley or the secondary pulley without switching a position of the spool when the engagement pressure is supplied to the second working oil chamber, and the spool is not locked at the first position and the switching pressure can switch the spool to the second position against the urging member when the engagement pressure is not supplied to the second working oil chamber.

With the hydraulic control device for an automatic transmission, when the engagement pressure is supplied to the second working oil chamber, the spool is locked at the first position, and the switching pressure can regulate the belt holding force without switching the position of the spool. That is, not only the low-pressure region but also the high-pressure region of the switching pressure can be utilized to regulate the belt holding force. Consequently, it is possible to improve the speed change rate of the continuously variable speed change mechanism. When the engagement pressure is not supplied to the second working oil chamber, on the other hand, the spool is not locked at the first position, and the switching pressure can switch the spool to the second position against the urging member.

Therefore, the switching valve (e.g. a fail-safe valve) can be switched using the switching pressure as a signal pressure.

BRIEF DESCRIPTION OF THE DRAWINGS

FIG. 2 is an engagement table of the automatic transmission according to the first embodiment.

DETAILED DESCRIPTION OF EMBODIMENTS

First Embodiment

Figure 1:
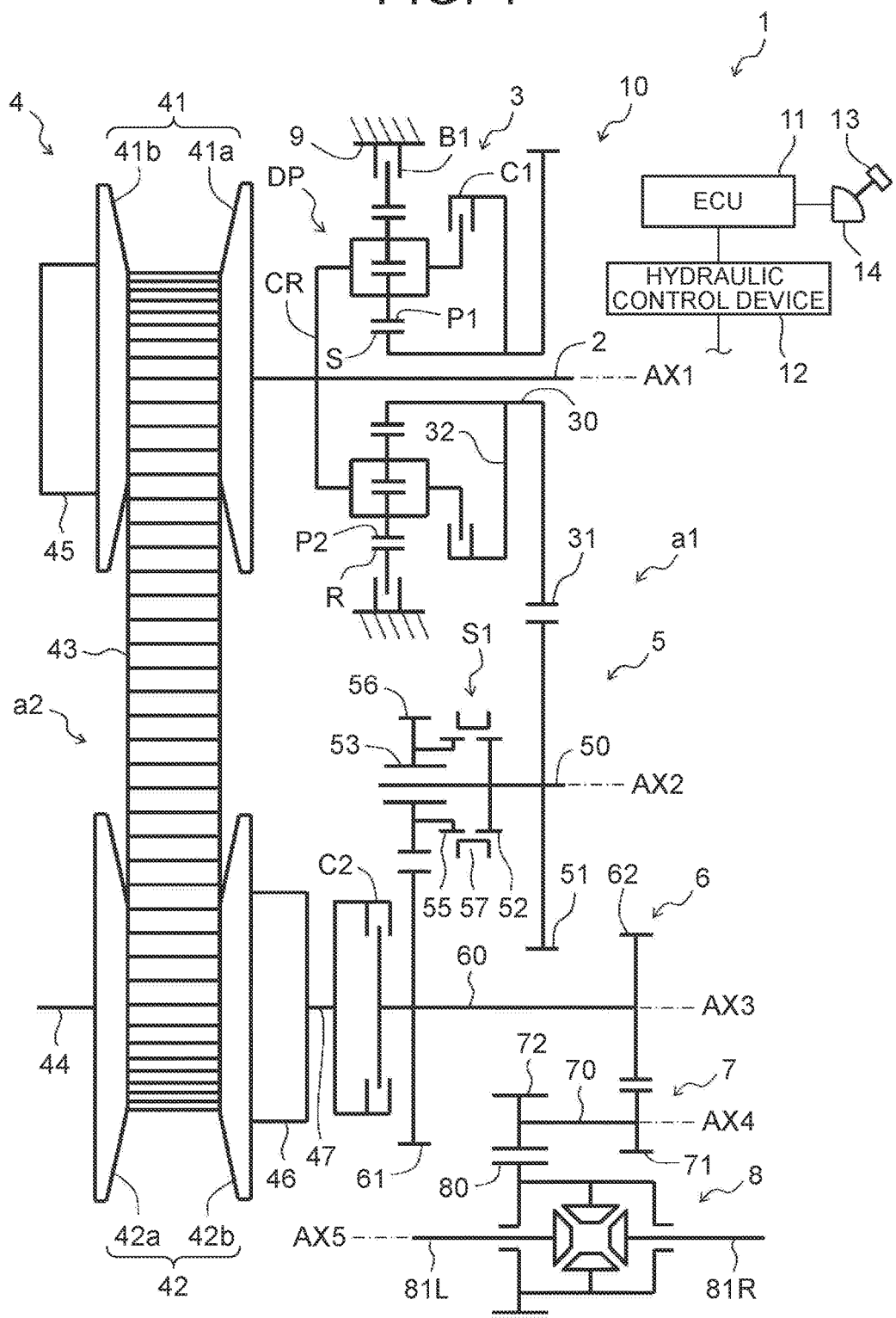
FIG. 1 is a skeleton diagram illustrating an automatic transmission according to a first embodiment.

A hydraulic control device 12 for an automatic transmission 10 according to a first embodiment will be described below with reference to FIGS. 1 to 4. The term "drivably coupled" as used herein refers to a state in which rotary elements are coupled to each other in such a way that allows transfer of a drive force, which includes a state in which the rotary elements are coupled to each other so as to rotate together with each other, and a state in which the rotary elements are coupled to each other via a clutch or the like in such a way that allows transfer of a drive force.

A schematic configuration of a vehicle 1 that includes the automatic transmission 10 according to the embodiment will be described with reference to FIG. 1. The vehicle 1 includes the automatic transmission 10, a control device (ECU) 11, and the hydraulic control device 12.

The automatic transmission 10 includes a torque converter 15 (see FIG. 3), a forward/reverse switching device 3 that has an input shaft 2, a continuously variable speed change mechanism 4, a speed-reduction gear mechanism 5, an output gear portion 6 that has a driving shaft 60, a counter shaft portion 7, a differential device 8, and a transmission case 9 that houses such components. In addition, the automatic transmission 10 is formed with a first power transfer path a1 that couples the input shaft 2 of the forward/reverse switching device 3 and the driving shaft 60 of the output gear portion 6 to each other via the forward/reverse switching device 3, and a second power transfer path (power transfer path) a2 that couples the input shaft 2 and the driving shaft 60 to each other via the continuously variable speed change mechanism 4. In addition, the automatic transmission 10 includes axes that are parallel to each other, namely a first axis AX1 to a fifth axis AX5. The automatic transmission 10 further includes a plurality of engagement elements disposed in the power transfer paths a1 and a2 from the input shaft 2 to the driving shaft 60 and engaged and disengaged to allow connection and disconnection of the power transfer paths a1 and a2, namely a first clutch (first forward engagement element) C1, a second clutch (second forward engagement element) C2, a first brake (reverse engagement element) B1, and a synchronization mechanism (synchronization mesh mechanism) S1.

The first axis AX1 is coaxial with a crankshaft of an internal combustion engine (drive source) (not illustrated). An input shaft of the automatic transmission 10 coupled to the crankshaft, the torque converter 15, the input shaft 2 of the forward/reverse switching device 3 and the continuously variable speed change mechanism 4, a planetary gear DP of the forward/reverse switching device 3, the first clutch C1, the first brake B1, and a primary pulley 41 of the continuously variable speed change mechanism 4 are disposed on the first axis AX1.

The speed-reduction gear mechanism 5 is disposed on the second axis AX2. A secondary pulley 42 of the continuously variable speed change mechanism 4, the second clutch C2, and the output gear portion 6 are disposed on the third axis AX3. The counter shaft portion 7 is disposed on the fourth axis AX4. The differential device 8 and left and right drive shafts 81L and 81R are disposed on the fifth axis AX5.

The input shaft of the automatic transmission 10, which is coupled to the crankshaft, is coupled to the input shaft 2 of the forward/reverse switching device 3 and the continuously variable speed change mechanism 4 via the torque converter 15. The torque converter 15 has a lock-up clutch 16, and includes a lock-up on port 15a to which a hydraulic pressure for engaging the lock-up clutch 16 is supplied and a lock-up off port 15b to which a hydraulic pressure for disengaging the lock-up clutch 16 is supplied (see FIG. 3).

The forward/reverse switching device 3 includes the planetary gear DP, the first brake B1, and the first clutch C1, and is configured for transfer with the rotational direction switched in accordance with the travel direction of the vehicle 1. The input shaft 2 passes through the inner peripheral side of the planetary gear DP to be connected to the primary pulley 41 of the continuously variable speed change mechanism 4, and to be connected to a carrier CR of the planetary gear DP. The planetary gear DP is constituted of a so-called double-pinion planetary gear that has a sun gear S, a ring gear R, and the carrier CR which rotatably supports a pinion P1 meshed with the sun gear S and a pinion P2 meshed with the ring gear R. Rotation of the ring gear R with respect to the transmission case 9 can be locked by the first brake B1. In addition, the sun gear S is directly coupled to a hollow shaft 30, the carrier CR is connected to the hollow shaft 30 via the first clutch C1, and the hollow shaft 30 is coupled to a forward/reverse rotation output gear 31. The hollow shaft 30 is also coupled to a clutch drum 32 of the first clutch C1. The forward/reverse rotation output gear 31, the hollow shaft 30, and the clutch drum 32 integrally constitute a rotary member.

The first clutch C1 forms a path for transferring rotation in the forward direction of the vehicle 1 when the first clutch C1 is engaged. The first brake B1 forms a path for transferring rotation in the reverse direction of the vehicle 1 when the first brake B1 is engaged. The forward/reverse rotation output gear 31 is meshed with an input gear 51 of the speed-reduction gear mechanism 5.

The speed-reduction gear mechanism 5 includes: a first rotary shaft 50 disposed on the second axis AX2; the input gear 51 which is provided on the first rotary shaft 50; the synchronization mechanism S1 which is provided on the first rotary shaft 50 and which is provided in the first power transfer path a1; and a second rotary shaft 53 and an output gear 56 constituted of a hollow shaft that is relatively rotatable with respect to the first rotary shaft 50. The input gear 51 is integrally fixed and coupled to one side of the first rotary shaft 50. The second rotary shaft 53 is supported on the outer peripheral side of the other side of the first rotary shaft 50 so as to be relatively rotatable through a needle bearing (not illustrated), for example. That is, the second rotary shaft 53 is disposed as a double shaft that overlaps the first rotary shaft 50 in the axial direction. The output gear 56 is integrally fixed and coupled to the second rotary shaft 53. The output gear 56 is meshed with an input gear 61 of the output gear portion 6.

The synchronization mechanism S1 includes a drive gear 52, a driven gear 55, a synchronizer (not illustrated), a sleeve 57, and a shift fork (not illustrated), and can engage and disengage the first rotary shaft 50 and the second rotary shaft 53 with and from each other.

The drive gear 52 is smaller in diameter than the input gear 51, and is integrally fixed and coupled to one side of the first rotary shaft 50. The driven gear 55 is the same in diameter as the drive gear 52 and smaller in diameter than the output gear 56, and is integrally fixed and coupled to the second rotary shaft 53. The synchronizer is disposed on the drive gear 52 side of the driven gear 55.

A tooth surface is formed on the inner peripheral surface of the sleeve 57. The sleeve 57 is disposed on the outer peripheral side of the drive gear 52 and the driven gear 55 so as to be movable in the axial direction. The sleeve 57 is moved in the axial direction by a shift fork driven by a hydraulic servo 92 (see FIG. 3) to be discussed later to be slid between a position at which the sleeve 57 is meshed with only the drive gear 52 and a position at which the sleeve 57 is meshed with both the drive gear 52 and the driven gear 55. Consequently, the drive gear 52 and the driven gear 55 can be switched between the disengaged state (disconnected state) and the engaged state (drivably coupled state).

A belt-type automatic continuously variable speed change mechanism that can continuously change the speed ratio is applied as the continuously variable speed change mechanism 4. The continuously variable speed change mechanism 4 is configured to include: the primary pulley 41 which is connected to the input shaft 2; the secondary pulley 42; and an endless belt 43 wound around the primary pulley 41 and the secondary pulley 42. The primary pulley 41 has a fixed sheave 41a and a movable sheave 41b that have respective wall surfaces formed in a conical shape so as to oppose each other, the fixed sheave 41a being fixed so as to be immovable in the axial direction with respect to the input shaft 2, and the movable sheave 41b being supported so as to be movable in the axial direction with respect to the input shaft 2. The belt 43 is held by a groove portion with a V-shape in section formed by the fixed sheave 41a and the movable sheave 41b.

Similarly, the secondary pulley 42 has a fixed sheave 42a and a movable sheave 42b that have respective wall surfaces formed in a conical shape so as to oppose each other, the fixed sheave 42a being fixed so as to be immovable in the axial direction with respect to a center shaft 44, and the movable sheave 42b being supported so as to be movable in the axial direction with respect to the center shaft 44. The belt 43 is held by a groove portion with a V-shape in section formed by the fixed sheave 42a and the movable sheave 42b. The fixed sheave 41a of the primary pulley 41 and the fixed sheave 42a of the secondary pulley 42 are disposed opposite to each other in the axial direction with respect to the belt 43.

In addition, a hydraulic servo 45 is disposed on the back surface side of the movable sheave 41b of the primary pulley 41, and a hydraulic servo 46 is disposed on the back surface side of the movable sheave 42b of the secondary pulley 42. A primary pulley pressure is supplied to the hydraulic servo 45 as a working oil pressure from a primary pressure control valve 22 (see FIG. 3) of the hydraulic control device 12. A secondary pulley pressure is supplied to the hydraulic servo 46 as a working oil pressure from a secondary pressure control valve (not illustrated) of the hydraulic control device 12. The hydraulic servos 45 and 46 are configured to be supplied with the working oil pressures to generate a belt holding force corresponding to load torque, and to generate a holding force for changing or fixing the speed ratio. That is, the continuously variable speed change mechanism 4 controls the pulley widths of the primary pulley 41 and the secondary pulley 42 so as to be able to continuously change the speed ratio between the input shaft 2 and the driving shaft 60.

An output shaft 47 of the movable sheave 42b of the secondary pulley 42 is connected to the driving shaft 60 of the output gear portion 6 via the second clutch C2. That is, the second clutch C2 is provided in the second power transfer path a2.

The output gear portion 6 is configured to have the driving shaft 60, the input gear 61 which is fixed and coupled to one end side of the driving shaft 60, and a counter gear 62 fixed and coupled to the other end side of the driving shaft 60. The counter gear 62 is meshed with a driven gear 71 of the counter shaft portion 7.

The counter shaft portion 7 is configured to have a counter shaft 70, the driven gear 71 which is fixed and coupled to the counter shaft 70, and a drive gear 72 fixed and coupled to the counter shaft 70. The drive gear 72 is meshed with a differential ring gear 80 of the differential device 8.

The differential device 8 is configured to transfer rotation of the differential ring gear 80 to the left and right drive shafts 81L and 81R while absorbing a difference in rotation therebetween. The left and right drive shafts 81L and 81R are coupled to left and right wheels (not illustrated), respectively. The differential ring gear 80 is meshed with the drive gear 72, and the driven gear 71 is meshed with the counter gear 62. Thus, the driving shaft 60 of the output gear portion 6, the counter shaft 70 of the counter shaft portion 7, and the differential device 8 are drivably coupled to the wheels via the left and right drive shafts 81L and 81R to always operate in conjunction with the wheels.

The ECU 11 includes a CPU, a ROM that stores a processing program, a RAM that temporarily stores data, input and output ports, and a communication port, for example, and outputs various types of signals, such as a control signal for the hydraulic control device 12, from the output port. The vehicle 1 is provided with a shift lever 13 that enables a driver to perform an operation to select a travel range, and a shift position detection section 14 that detects the shift position of the shift lever 13. The shift position detection section 14 is connected to the ECU 11 via the input port.

In the automatic transmission 10 configured as described above, the first clutch C-1, the second clutch C2, the synchronization mechanism S1, and the first brake B-1 illustrated in the skeleton diagram of FIG. 1 are engaged and disengaged in combinations indicated in the engagement table of FIG. 2 to establish a forward non-continuously-variable mode, a forward continuously-variable mode, and a reverse non-continuously-variable mode. In the embodiment, the non-continuously-variable mode means a forward first speed or a reverse first speed with which the drive force is rotationally transferred through the first power transfer path a1. However, the present disclosure is not limited thereto, and multi-step speed change may be meant. In the embodiment, meanwhile, the continuously-variable mode means forward continuously variable speed change with which the drive force is rotationally transferred through the second power transfer path a2.

Figure 3:
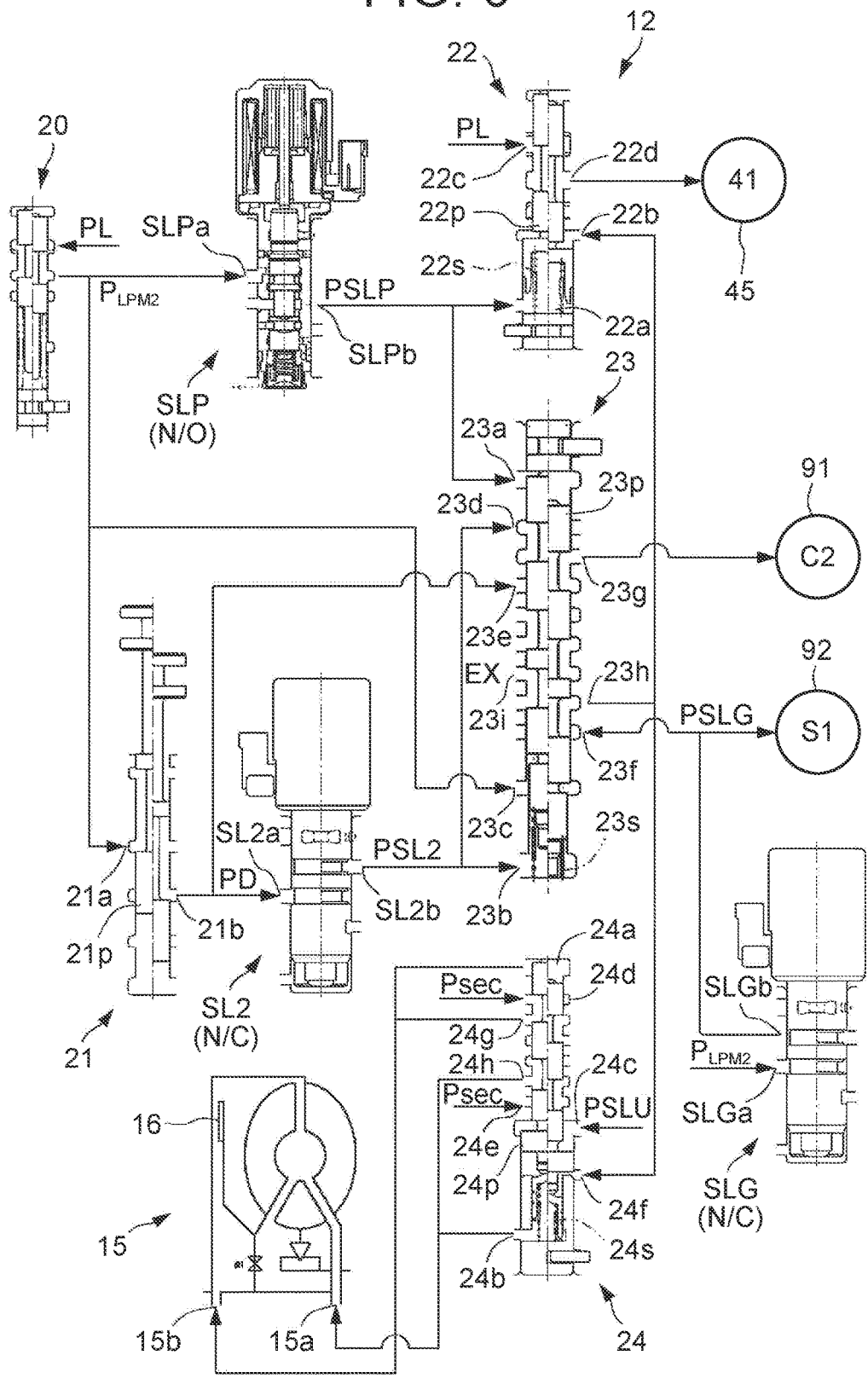
FIG. 3 is a hydraulic circuit diagram illustrating a hydraulic control device according to the first embodiment.

The hydraulic control device 12 regulates a hydraulic pressure generated by an oil pump (not illustrated) to a line pressure PL and a secondary pressure Psec on the basis of the throttle opening using a primary regulator valve and a secondary regulator valve. As illustrated in FIG. 3, the hydraulic control device 12 includes a line pressure modulator valve 20, a primary linear solenoid valve (primary solenoid valve) SLP, the primary pressure control valve 22, a manual valve (source pressure supply section) 21, a linear solenoid valve (solenoid valve) SL2, a linear solenoid valve SLG, a lock-up pressure difference control valve 24, a switching valve (fail-safe valve) 23, and so forth. The hydraulic control device 12 has a secondary linear solenoid valve (not illustrated in FIG. 3) that generates a secondary control pressure PSLS from a modulator pressure $P_{LPM2}$.

The hydraulic control device 12 is connected to: a hydraulic servo (not illustrated) that can be actuated by a hydraulic pressure to engage and disengage the first clutch C1; a hydraulic servo 91 that can be actuated by a hydraulic pressure to engage and disengage the second clutch C2; the hydraulic servo 92 which can be actuated by a hydraulic pressure to engage and disengage the synchronization mechanism S1; a hydraulic servo (not illustrated) that can be actuated by a hydraulic pressure to engage and disengage the first brake B1; the hydraulic servo 45 which actuates the primary pulley 41; and the hydraulic servo 46 (see FIG. 1) which actuates the secondary pulley 42. Consequently, the hydraulic control device 12 supplies and discharges the engagement pressure to and from various portions in accordance with an instruction from the ECU 11 to control speed change of the continuously variable speed change mechanism 4, engagement and disengagement of the first clutch C1, the second clutch C2, the first brake B1, and the synchronization mechanism S1, and so forth.

The line pressure modulator valve 20 regulates the line pressure PL to generate the modulator pressure $P_{LPM2}$, which is a constant pressure that is lower than the line pressure PL.

The primary linear solenoid valve SLP includes: an input port SLPa to which the modulator pressure $P_{LPM2}$ is input; and an output port SLPb that communicates with a first working oil chamber 22a of the primary pressure control valve 22. The primary linear solenoid valve SLP can regulate the input modulator pressure $P_{LPM2}$ to generate a primary control pressure (switching pressure) PSLP to supply the primary control pressure PSLP from the output port SLPb to the primary pressure control valve 22 as a control pressure. The primary linear solenoid valve SLP is of a normally open type which outputs a hydraulic pressure when not energized.

The primary pressure control valve 22 includes: a spool 22p that can be switched between a position (fully open state) (hereinafter referred to as a "left-half position") indicated in the left half in the drawing and a position (fully closed state) (hereinafter referred to as a "right-half position") indicated in the right half in the drawing; and a spring 22s constituted of a compression coil spring that urges the spool 22p toward the left-half position. The primary pressure control valve 22 includes: the first working oil chamber 22a to which the primary control pressure PSLP is input in the direction in which the spool 22p is pressed toward the left-half position; and a second working oil chamber 22b which communicates with a second output port 23h of the switching valve 23 to be discussed later and to which an engagement pressure PSLG can be input in the direction in which the spool 22p is pressed toward the right-half position. The primary pressure control valve 22 also includes: an input port 22c to which the line pressure PL is input; and an output port 22d that supplies the primary pulley pressure after being regulated to the hydraulic servo 45 for the primary pulley 41. The primary pressure control valve 22 adjusts the magnitude of the primary pulley pressure, which is regulated on the basis of the line pressure PL, in accordance with the magnitude of the primary control pressure PSLP.

The manual valve 21 includes: a spool 21p that is mechanically or electrically moved in accordance with an operation of the shift lever 13 (see FIG. 1); an input port 21a to which the modulator pressure $P_{LPM2}$ is input; and an output port 21b that outputs the modulator pressure $P_{LPM2}$ as a forward range pressure (source pressure) PD in the case where the spool 21p is at a D (drive) range position. That is, the forward range pressure PD is supplied from the manual valve 21 in the case where the travel range is the forward range.

The linear solenoid valve SL2 includes: an input port SL2a to which the forward range pressure PD is input; and an output port SL2b that communicates with a second working oil chamber 23b and a first input port 23d of the switching valve 23 to be discussed later. The linear solenoid valve SL2 can regulate the input forward range pressure PD, to generate an engagement pressure PSL2 to be supplied to the hydraulic servo 91, and to supply the engagement pressure PSL2 from the output port SL2b. The linear solenoid valve SL2 is of a normally closed type which does not output a hydraulic pressure when not energized.

The linear solenoid valve SLG includes: an input port SLGa to which the modulator pressure $P_{LPM2}$ is input; and an output port SLGb that communicates with the hydraulic servo 92 and a third input port 23f of the switching valve 23. The linear solenoid valve SLG can regulate the input modulator pressure $P_{LPM2}$, to generate the engagement pressure PSLG to be supplied to the hydraulic servo 92 and the third input port 23f, and to supply the engagement pressure PSLG from the output port SLGb. The linear solenoid valve SLG is of a normally closed type which does not output a hydraulic pressure when not energized.

The lock-up pressure difference control valve 24 includes: a spool 24p that can be switched between a position (lock-up off state) indicated in the left half in the drawing and a position (lock-up on state) indicated in the right half in the drawing; and a spring 24s constituted of a compression coil spring that urges the spool 24p toward the left-half position. The lock-up pressure difference control valve 24 includes: a first working oil chamber 24a to which a lock-up off pressure can be input in the direction in which the spool 24p is pressed toward the right-half position; a second working oil chamber 24b to which a lock-up on pressure can be input in the direction in which the spool 24p is pressed toward the left-half position; and a third working oil chamber 24c to which a lock-up pressure PSLU is supplied in the direction in which the spool 24p is pressed toward the right-half position. The lock-up pressure difference control valve 24 also includes: a first input port 24d and a second input port 24e to which the secondary pressure Psec is input; a third input port 24f that communicates with the second output port 23h of the switching valve 23; a first output port 24g that communicates with the lock-up off port 15b and the first working oil chamber 24a to output a lock-up off pressure; and a second output port 24h that communicates with the lock-up on port 15a and the second working oil chamber 24b to output a lock-up on pressure. The lock-up pressure difference control valve 24 regulates the lock-up pressure PSLU to control the state of engagement of the lock-up clutch 16.

The switching valve 23, which is the characteristic portion of the embodiment, includes: a spool 23p that can be switched between a position (normal state, first position) indicated in the left half in the drawing and a position (failure state, second position) indicated in the right half in the drawing; and a spring (urging member) 23s constituted of a compression coil spring that urges the spool 23p toward the left-half position. The switching valve 23 includes: a first working oil chamber 23a to which the primary control pressure PSLP is input in the direction in which the spool 23p is pressed toward the right-half position; the second working oil chamber 23b to which the engagement pressure PSL2 is input in the direction in which the spool 23p is pressed toward the left-half position; and a third working oil chamber 23c to which the modulator pressure $P_{LPM2}$ is input in the direction in which the spool 23p is pressed toward the left-half position. The switching valve 23 also includes: the first input port 23d to which the engagement pressure PSL2 is input; a second input port 23e to which the forward range pressure PD is input; and the third input port 23f to which the engagement pressure PSLG is input. The switching valve 23 further includes: a first output port 23g that communicates with the hydraulic servo 91; the second output port 23h which communicates with the second working oil chamber 22b of the primary pressure control valve 22 and the third input port 24f of the lock-up pressure difference control valve 24; and a drain port 23i.

The switching valve 23 is configured such that the first input port 23d is communicated with the first output port 23g, the second input port 23e and the third input port 23f are blocked, and the second output port 23h is communicated with the drain port 23i when the spool 23p is in the normal state at the left-half position. Meanwhile, the switching valve 23 is configured such that the first input port 23d is blocked, the second input port 23e is communicated with the first output port 23g, and the third input port 23f is communicated with the second output port 23h when the spool 23p is in the failure state at the right-half position.

The spool 23p is urged toward the left-half position (normal state) by the urging force of the spring 23s and the modulator pressure $P_{LPM2}$ which is input to the third working oil chamber 23c. Therefore, the urging force required for the spring 23s can be reduced compared to a case where the third working oil chamber 23c is not provided or the modulator pressure $P_{LPM2}$ is not input.

Next, operation of the hydraulic control device 12 for the automatic transmission 10 will be described.

When the internal combustion engine is started, the line pressure PL and the secondary pressure Psec are generated, and the modulator pressure $P_{LPM2}$ is generated by the line pressure modulator valve 20. The modulator pressure $P_{LPM2}$ is supplied to the primary linear solenoid valve SLP, the manual valve 21, the switching valve 23, and the linear solenoid valve SLG. The linear solenoid valve SLG regulates the engagement pressure PSLG to supply the engagement pressure PSLG to the hydraulic servo 92 for the synchronization mechanism S1 to engage the synchronization mechanism S1.

When the shift position is switched from the P range to the D range, the forward range pressure PD is output from the manual valve 21. At a low speed in the forward range, the ECU 11 selects the non-continuously-variable mode, and therefore performs control so as to engage the first clutch C1 with the synchronization mechanism S1 kept engaged (see FIG. 2). At this time, the continuously variable speed change mechanism 4 is not used, and the lock-up clutch 16 is kept disengaged. At this time, the second clutch C2 is in the disengaged state, and thus the engagement pressure PSL2 is not output from the linear solenoid valve SL2, and the switching valve 23 is not locked in the normal state. Since only the primary control pressure PSLP, which is as low as a stand-by pressure, is output from the primary linear solenoid valve SLP, however, the switching valve 23 is kept in the normal state. The vehicle 1 travels forward in the non-continuously-variable mode.

When the vehicle 1 accelerates in the forward range, the ECU 11 performs control so as to disengage the first clutch C1 and engage the second clutch C2 in an interchanging manner with the synchronization mechanism S1 kept engaged in order to switch from the non-continuously-variable mode to the continuously-variable mode (see FIG. 2). To this end, the ECU 11 causes the linear solenoid valve SL2 to output the engagement pressure PSL2 to supply the engagement pressure PSL2 to the first input port 23d of the switching valve 23 and supply the engagement pressure PSL2 from the first output port 23g to the hydraulic servo 91 for the second clutch C2 to engage the second clutch C2 while disengaging the first clutch C1. In addition, the ECU 11 determines whether or not to engage the lock-up clutch 16 on the basis of the vehicle speed, the accelerator operation amount, or the like, and engages the lock-up clutch 16 by supplying the regulated lock-up pressure PSLU in the case where the ECU 11 has determined to engage the lock-up clutch 16.

Here, in order to actuate the continuously variable speed change mechanism 4, the ECU 11 causes the primary linear solenoid valve SLP to output the primary control pressure PSLP and causes the primary pressure control valve 22 to regulate the primary pulley pressure and supply the primary pulley pressure to the hydraulic servo 45 for the primary pulley 41. At this time, the primary control pressure PSLP is supplied to the first working oil chamber 23a of the switching valve 23. However, the engagement pressure PSL2 of the linear solenoid valve SL2 is concurrently supplied to the second working oil chamber 23b as a resisting pressure to lock the spool 23p in the normal state, and thus the spool 23p is not switched to the failure state. Therefore, switching of the switching valve 23 to the failure state is suppressed even if the primary control pressure PSLP is used in the high-pressure region. Thus, the primary control pressure PSLP, which is high, can be used to control the primary pulley pressure, which improves the speed change rate compared to a case where the high-pressure region cannot be used.

Next, operation for a case where all the linear solenoid valves are subjected to a failure due to a complete wire break or the linear solenoid valve SL2 is subjected to an off failure for some reason, for example, will be described. In this case, none of the first clutch C1, the synchronization mechanism S1, and the second clutch C2 is engaged since all of the linear solenoid valve SL2, and the linear solenoid valve SLG are of a normally closed type, and thus the vehicle cannot travel forward in this state.

Here, the linear solenoid valve SL2 is of a normally closed type, and thus cannot output the engagement pressure PSL2. Thus, the switching valve 23 is not locked in the normal state since the engagement pressure PSL2 is not supplied. In contrast, the primary linear solenoid valve SLP (and the secondary linear solenoid valve) is of a normally open type, and thus can output the primary control pressure PSLP. The switching valve 23 is switched to the failure state since the primary control pressure PSLP is supplied. Consequently, the forward range pressure PD is supplied to the second clutch C2 via the switching valve 23 so that the second clutch C2 can be engaged. Since the primary control pressure PSLP and the secondary control pressure can be supplied, in addition, the continuously variable speed change mechanism 4 can be actuated, which allows the vehicle to travel forward utilizing the second power transfer path a2.

Next, operation for a case where the primary linear solenoid valve SLP alone is subjected to an off failure, for example, will be described. In this case, the primary control pressure PSLP which is output from the primary linear solenoid valve SLP cannot be controlled, and in this state, speed change cannot be made by the continuously variable speed change mechanism 4. Here, the ECU 11 stops the linear solenoid valve SL2, and switches the switching valve 23 to the failure state using the primary control pressure PSLP. Consequently, the engagement pressure PSLG from the linear solenoid valve SLG is supplied to the primary pressure control valve 22 via the switching valve 23 to act as a resisting pressure against the primary control pressure PSLP. Therefore, the ECU 11 can regulate the primary pulley pressure by regulating the engagement pressure PSLG, securing a drive force. With the switching valve 23 switched to the failure state, in addition, the forward range pressure PD is supplied to the second clutch C2 via the switching valve 23 so that the second clutch C2 can be engaged. Therefore, even if the linear solenoid valve SL2 is stopped, the second clutch C2 can be engaged so that the vehicle can travel forward utilizing the second power transfer path a2.

Next, operation for a case where a linear solenoid valve SLU (not illustrated) that regulates the lock-up pressure PSLU is subjected to an on failure, for example, will be described. In this case, the lock-up pressure difference control valve 24 is switched to the lock-up on state, and in this state, the lock-up clutch 16 will become uncontrollable while being kept engaged. Here, the ECU 11 stops the linear solenoid valve SL2, and switches the switching valve 23 to the failure state using the primary control pressure PSLP. Consequently, the engagement pressure PSLG from the linear solenoid valve SLG is supplied to the lock-up pressure difference control valve 24 via the switching valve 23 to act as a resisting pressure against the lock-up pressure PSLU. Therefore, the ECU 11 can disengage the lock-up clutch 16 by regulating the engagement pressure PSLG, securing disengagement. With the switching valve 23 switched to the failure state, in addition, the forward range pressure PD is supplied to the second clutch C2 via the switching valve 23 so that the second clutch C2 can be engaged. Therefore, even if the linear solenoid valve SL2 is stopped, the second clutch C2 can be engaged so that the vehicle can travel forward utilizing the second power transfer path a2.

With the hydraulic control device 12 for the automatic transmission 10 according to the embodiment, as has been described above, the engagement pressure PSL2 of the linear solenoid valve SL2 is supplied to the second working oil chamber 23b of the switching valve 23 so that the spool 23p is locked in the normal state and the primary control pressure PSLP can regulate the belt holding force of the primary pulley 41 without changing the position of the spool 23p. That is, not only the low-pressure region but also the high-pressure region of the primary control pressure PSLP can be utilized to regulate the belt holding force, and thus the speed change rate of the continuously variable speed change mechanism 4 can be improved.

With the hydraulic control device 12 for the automatic transmission 10 according to the embodiment, in addition, the engagement pressure PSL2 is not supplied to the second working oil chamber 23b so that the spool 23p is not locked in the normal state and the primary control pressure PSLP can switch the spool 23p to the failure state against the spring 23s. Therefore, the switching valve 23 can be switched to the failure state using the primary control pressure PSLP as a signal pressure. Consequently, outputting the primary control pressure PSLP can switch the switching valve 23 to the failure state in the case where the linear solenoid valves are subjected to a complete wire break or the linear solenoid valve SL2 is subjected to an off failure, for example. Alternatively, stopping operation of the linear solenoid valve SL2 and outputting the primary control pressure PSLP can switch the switching valve 23 to the failure state in the case where the primary linear solenoid valve SLP is subjected to an off failure or the linear solenoid valve SLU is subjected to an on failure.

In addition, the hydraulic control device 12 for the automatic transmission 10 according to the embodiment further includes the source pressure supply section which supplies the forward range pressure PD; and the switching valve 23 is a fail-safe valve that is brought into the normal state, in which the engagement pressure PSL2 is supplied to the second clutch C2, at a first position, and that is brought into the failure state, in which the forward range pressure PD is supplied to the second clutch C2, at a second position. Therefore, the second clutch C2 can be engaged even if the switching valve 23 is switched, securing forward travel of the vehicle 1.

In the hydraulic control device 12 for the automatic transmission 10 according to the embodiment, in addition, the primary linear solenoid valve SLP is of a normally open type which outputs the engagement pressure when not energized. Therefore, the primary control pressure PSLP can be output when the linear solenoid valves are subjected to a complete wire break or when the primary linear solenoid valve SLP is subjected to an off failure, for example, and the switching valve 23 can be switched to the failure state using the primary control pressure PSLP.

In the hydraulic control device 12 for the automatic transmission 10 according to the embodiment, in addition, the solenoid valve which supplies a switching pressure for regulating the belt holding force is the primary solenoid valve SLP. That is, the switching pressure is the primary control pressure PSLP. Here, when the driver depresses an accelerator pedal and a brake pedal at the same time (in a stalled state), the ECU 11 occasionally maximizes the secondary control pressure PSLS to prevent a skid of the belt 43. In that case, the primary control pressure PSLP is relatively low, and therefore switching of the switching valve 23 to the failure state by the primary control pressure PSLP can be suppressed even if the engagement pressure PSL2 is not output.

In the hydraulic control device 12 for the automatic transmission 10 according to the embodiment, in addition, the linear solenoid valve SL2 is of a normally closed type which does not output the engagement pressure when not energized. Therefore, the engagement pressure PSL2 is not output when the linear solenoid valves are subjected to a complete wire break or when the linear solenoid valve SL2 is subjected to an off failure, for example. Thus, there is no resisting pressure for the switching valve 23, and the switching valve 23 is unlocked in the normal state, and switched to the failure state by the primary control pressure PSLP.

In the hydraulic control device 12 for the automatic transmission 10 according to the embodiment, in addition, the automatic transmission 10 includes the forward/reverse switching device 3 which has the first clutch C1 which forms a path for transferring rotation in the forward direction of the vehicle 1 when the first clutch C1 is engaged and the first brake B1 which forms a path for transferring rotation in the reverse direction of the vehicle 1 when the first brake B1 is engaged, the synchronization mechanism S1 which is provided in the first power transfer path a1 which couples the input shaft 2 and the driving shaft 60 to each other via the forward/reverse switching device 3, and the second clutch C2 which is provided in the second power transfer path a2 which couples the input shaft 2 and the driving shaft 60 to each other via the continuously variable speed change mechanism 4; and the engagement element is the second clutch C2.

Therefore, with the hydraulic control device 12 for the automatic transmission 10 according to the embodiment, two power transfer paths a1 and a2 are provided, and the speed change rate of the continuously variable speed change mechanism 4 of the automatic transmission 10 with five axes which is switched by the synchronization mechanism S1 and the second clutch C2 can be improved.

In the embodiment discussed above, the switching valve 23 provides three functions, namely securing of forward travel during a complete wire break or an off failure of the linear solenoid valve SL2, securing of a drive force during an off failure of the primary linear solenoid valve SLP, and securing of disengagement of the lock-up clutch 16 during an on failure of the linear solenoid valve SLU. However, the present disclosure is not limited thereto. For example, the switching valve 23 may provide one or two of the functions, or may provide a function that is different from the functions.

In the embodiment discussed above, in addition, the switching valve 23 is utilized as a fail-safe valve. However, the present disclosure is not limited thereto, and may be applied to the switching valve 23 in general which can switch the primary control pressure PSLP as a signal pressure.

In the embodiment discussed above, in addition, the solenoid valve which supplies the engagement pressure PSL2 to the second clutch C2 is the linear solenoid valve SL2. However, the present disclosure is not limited thereto. The solenoid valve which supplies the engagement pressure to the second clutch C2 may be another linear solenoid valve or a solenoid valve that performs duty control. The same applies to the primary linear solenoid valve SLP.

In the embodiment discussed above, in addition, the switching pressure is the primary control pressure PSLP. However, the present disclosure is not limited thereto. For example, as illustrated in FIG. 4, the switching pressure may be the secondary control pressure PSLS.

Figure 4:
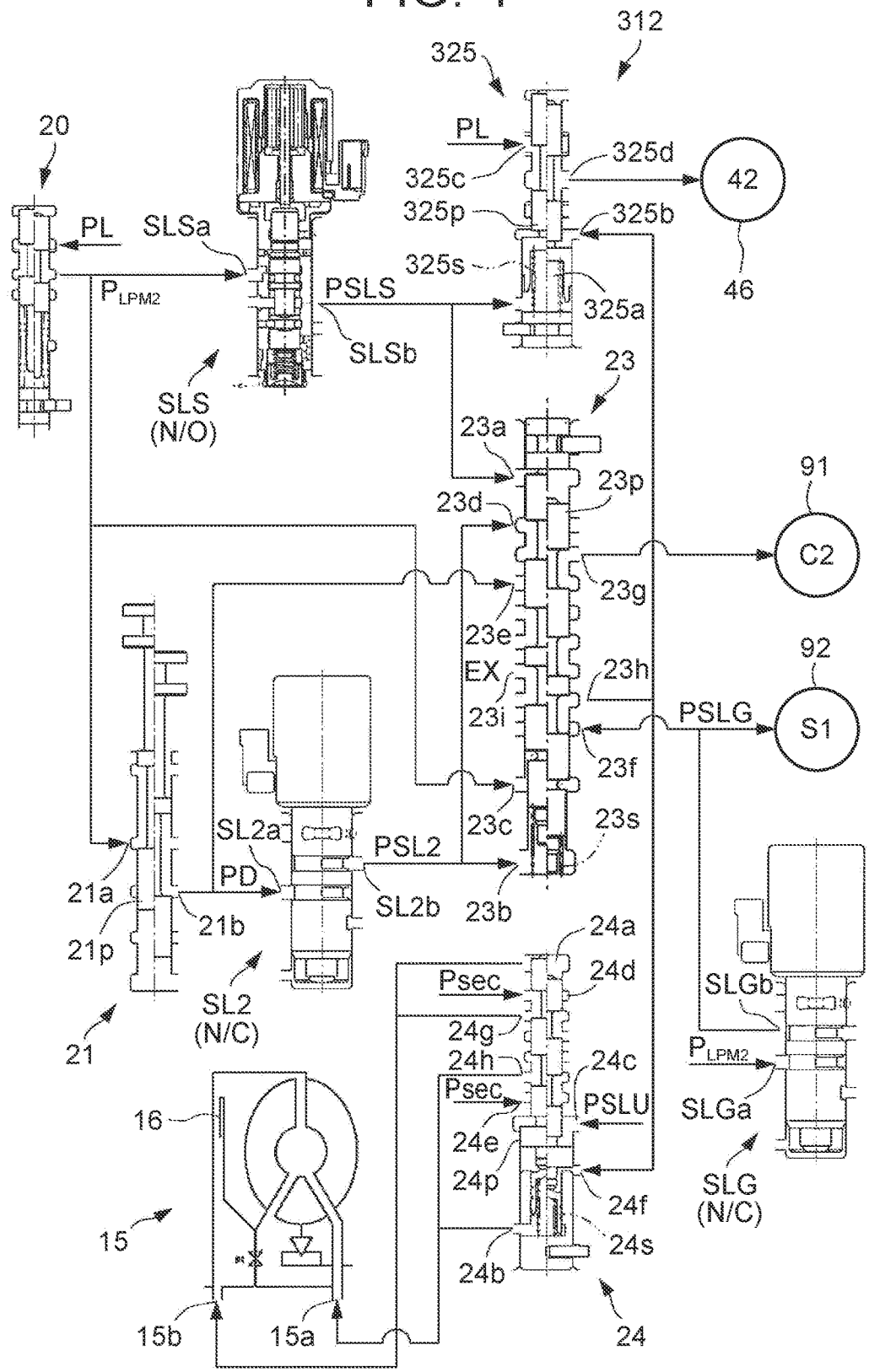
FIG. 4 is a hydraulic circuit diagram illustrating a hydraulic control device according to a modification of the first embodiment.

In this case, as illustrated in FIG. 4, a hydraulic control device 312 includes the line pressure modulator valve 20, a secondary linear solenoid valve (secondary solenoid valve) SLS, a secondary pressure control valve 325, the manual valve 21, the linear solenoid valve SL2, the linear solenoid valve SLG, the lock-up pressure difference control valve 24, the switching valve 23, and so forth. Here, components other than the secondary linear solenoid valve SLS and the secondary pressure control valve 325 are the same as those of the hydraulic control device 12 illustrated FIG. 3 and discussed above, and thus are given the same reference numerals to omit detailed description.

The secondary linear solenoid valve SLS includes: an input port SLSa to which the modulator pressure $P_{LPM2}$ is input; and an output port SLSb that communicates with a first working oil chamber 325a of the secondary pressure control valve 325. The secondary linear solenoid valve SLS can regulate the input modulator pressure $P_{LPM2}$ to generate the secondary control pressure (switching pressure) PSLS to supply the secondary control pressure PSLS from the output port SLSb to the secondary pressure control valve 325 as a control pressure. The secondary linear solenoid valve SLS is of a normally open type which outputs a hydraulic pressure when not energized.

The secondary pressure control valve 325 includes: a spool 325p that can be switched between a position (fully open state) (hereinafter referred to as a "left-half position") indicated in the left half in the drawing and a position (fully closed state) (hereinafter referred to as a "right-half position") indicated in the right half in the drawing; and a spring 325s constituted of a compression coil spring that urges the spool 325p toward the left-half position. The secondary pressure control valve 325 includes: a first working oil chamber 325a to which the secondary control pressure PSLS is input in the direction in which the spool 325p is pressed toward the left-half position; and a second working oil chamber 325b which communicates with the second output port 23h of the switching valve 23 and to which the engagement pressure PSLG can be input in the direction in which the spool 325p is pressed toward the right-half position. The secondary pressure control valve 325 also includes: an input port 325c to which the line pressure PL is input; and an output port 325d that supplies the secondary pulley pressure after being regulated to the hydraulic servo 46 for the secondary pulley 42. The secondary pressure control valve 325 adjusts the magnitude of the secondary pulley pressure, which is regulated on the basis of the line pressure PL, in accordance with the magnitude of the secondary control pressure PSLS.

With the hydraulic control device 312 according to the embodiment illustrated in FIG. 4, the engagement pressure PSL2 of the linear solenoid valve SL2 is supplied to the second working oil chamber 23b of the switching valve 23 so that the spool 23p is locked in the normal state and the secondary control pressure PSLS can regulate the belt holding force of the secondary pulley 42 without changing the position of the spool 23p. That is, not only the low-pressure region but also the high-pressure region of the secondary control pressure PSLS can be utilized to regulate the belt holding force, and thus the speed change rate of the continuously variable speed change mechanism 4 can be improved.

Also in the hydraulic control device 312 according to the embodiment illustrated in FIG. 4, the secondary linear solenoid valve SLS is of a normally open type. Therefore, the secondary control pressure PSLS can be output when the linear solenoid valves are subjected to a complete wire break or when the secondary linear solenoid valve SLS is subjected to an off failure, for example, and the switching valve 23 can be switched to the failure state using the secondary control pressure PSLS.

In the embodiment discussed above, in addition, the engagement pressure PSL2 of the linear solenoid valve SL2 is supplied to the second working oil chamber 23b of the switching valve 23, and the modulator pressure $P_{LPM2}$ is supplied to the third working oil chamber 23c. However, the present disclosure is not limited thereto. For example, the modulator pressure $P_{LPM2}$ may be supplied to the second working oil chamber 23b of the switching valve 23, and the engagement pressure PSL2 may be supplied to the third working oil chamber 23c.

Second Embodiment

Next, a hydraulic control device 112 for an automatic transmission 110 according to a second embodiment will be described with reference to FIGS. 5 and 6. The automatic transmission 110 according to the embodiment is different in configuration from that according to the first embodiment in that only one power transfer path b is provided. Therefore, the synchronization mechanism S1 and the second clutch C2, which are provided in the first embodiment, are not provided. Other similar components are given the same reference numerals to omit detailed description.

Figure 5:
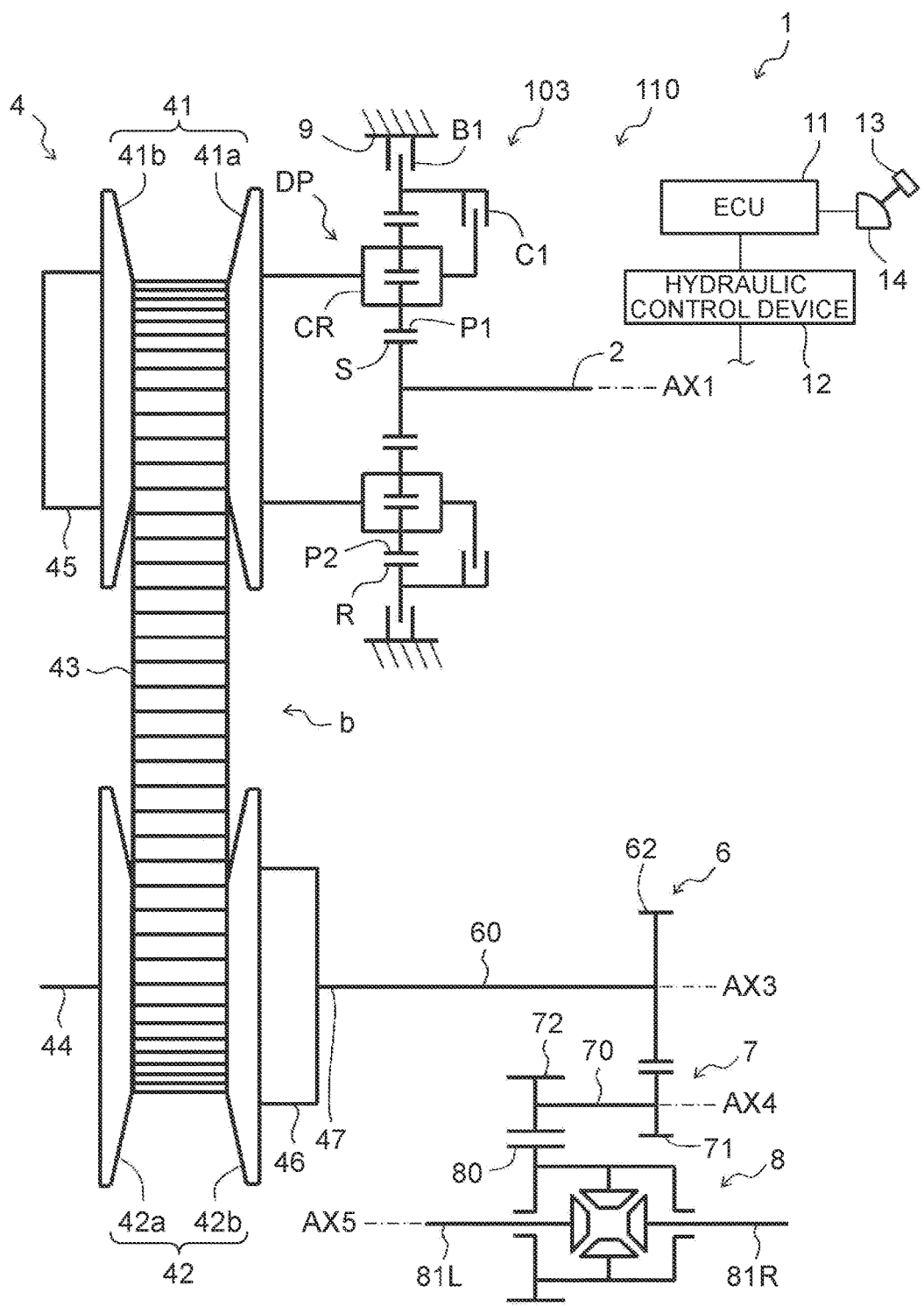
FIG. 5 is a skeleton diagram illustrating an automatic transmission according to a second embodiment.

As illustrated in FIG. 5, the automatic transmission 110 according to the embodiment includes a torque converter (not illustrated), a forward/reverse switching device 103 that has the input shaft 2, the continuously variable speed change mechanism 4, the output gear portion 6 which has the driving shaft 60, the counter shaft portion 7, the differential device 8, and the transmission case 9 which houses such components. Among these, only the forward/reverse switching device 103 is different in configuration from that according to the first embodiment, and thus will be described in detail.

The forward/reverse switching device 103 includes the first clutch (forward engagement element) C1 and the first brake (reverse engagement element) B1. The forward/reverse switching device 103 also includes the sun gear S which is coupled to the input shaft 2, the carrier CR which is coupled to the fixed sheave 41a, the first and second pinions P1 and P2 which are supported by the carrier CR, and the ring gear R, and constitutes a double-pinion planetary gear. The forward/reverse switching device 103 transfers rotation in the forward direction by engaging the first clutch C1 and disengaging the first brake B1, and transfers rotation in the reverse direction by disengaging the first clutch C1 and engaging the first brake B1.

Figure 6:
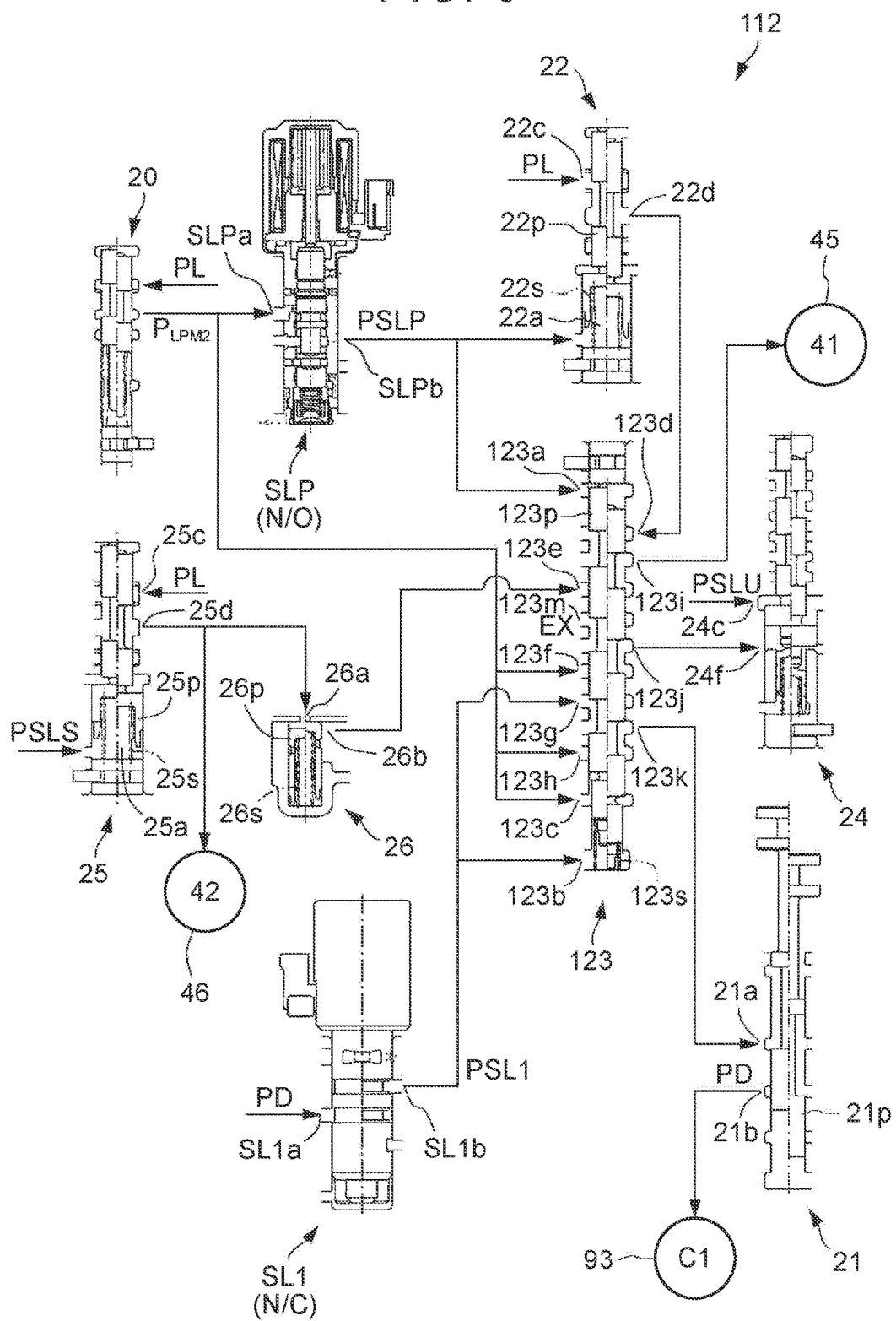
FIG. 6 is a hydraulic circuit diagram illustrating a hydraulic control device according to the second embodiment.

As illustrated in FIG. 6, the hydraulic control device 112 according to the embodiment includes the line pressure modulator valve (source pressure supply section) 20, the primary linear solenoid valve SLP, the primary pressure control valve 22, a secondary pressure control valve 25, a check valve 26, a linear solenoid valve (solenoid valve) SL1, the manual valve 21, the lock-up pressure difference control valve 24, a switching valve (fail-safe valve) 123, and so forth.

The line pressure modulator valve 20 supplies the modulator pressure (source pressure) $P_{LPM2}$ to the input port SLPa of the primary linear solenoid valve SLP and a third input port 123f, a fifth input port 123h, and a third working oil chamber 123c of the switching valve 123 to be discussed later. The primary linear solenoid valve SLP supplies the primary control pressure PSLP to the first working oil chamber 22a of the primary pressure control valve 22 and a first working oil chamber 123a of the switching valve 123. The primary pressure control valve 22 supplies the primary pulley pressure to a first input port 123d of the switching valve 123.

The secondary pressure control valve 25 includes: a spool 25p that can be switched between a position (fully open state) indicated in the left half in the drawing and a position (fully closed state) indicated in the right half in the drawing; and a spring 25s constituted of a compression coil spring that urges the spool 25p toward the left-half position. The secondary pressure control valve 25 includes a first working oil chamber 25a to which the secondary control pressure PSLS is input in the direction in which the spool 25p is pressed toward the left-half position. The secondary pressure control valve 25 also includes: an input port 25c to which the line pressure PL is input; and an output port 25d that supplies the secondary pulley pressure after being regulated to the hydraulic servo 46 for the secondary pulley 42. The secondary pressure control valve 25 adjusts the magnitude of the secondary pulley pressure, which is regulated on the basis of the line pressure PL, in accordance with the magnitude of the secondary control pressure PSLS.

The check valve 26 includes: an input port 26a to which the secondary pulley pressure is supplied; an output port 26b that communicates with a second input port 123e of the switching valve 123; a sealing member 26p that can switchably allow and block communication between the input port 26a and the output port 26b; and a spring 26s. The spring 26s is configured to urge the sealing member 26p so as to block communication between the input port 26a and the output port 26b, and to allow communication from the input port 26a toward the output port 26b at a hydraulic pressure that is lower than the secondary pulley pressure. Therefore, when the secondary pulley pressure is input to the input port 26a, the sealing member 26p is switched against the spring 26s to allow communication between the input port 26a and the output port 26b so that a hydraulic pressure can flow in only one direction from the input port 26a toward the output port 26b.

The linear solenoid valve SL1 includes: an input port SL1a to which the forward range pressure PD is input; and an output port SL1b that communicates with a second working oil chamber 123b and a fourth input port 123g of the switching valve 123. The linear solenoid valve SL1 can regulate the input forward range pressure PD, to generate an engagement pressure PSL1 to be supplied to the hydraulic servo 93, and to supply the engagement pressure PSL1 from the output port SL1b. The linear solenoid valve SL1 is of a normally closed type which does not output a hydraulic pressure when not energized.

The manual valve 21 includes: the spool 21p; the input port 21a to which the engagement pressure PSL1 or the modulator pressure $P_{LPM2}$ is input; and the output port 21b which outputs the engagement pressure PSL1 or the modulator pressure $P_{LPM2}$ as the forward range pressure PD in the case where the spool 21p is at the D range position.

The lock-up pressure difference control valve 24 includes: the third working oil chamber 24c to which the lock-up pressure PSLU is supplied in the direction in which the spool 24p (see FIG. 3) is pressed toward the right-half position; and the third input port 24f which communicates with a second output port 123j of the switching valve 123. The lock-up pressure difference control valve 24 regulates the lock-up pressure PSLU to control the state of engagement of the lock-up clutch 16 (see FIG. 3).

The switching valve 123, which is the characteristic portion of the embodiment, includes: a spool 123p that can be switched between a position (normal state, first position) indicated in the left half in the drawing and a position (failure state, second position) indicated in the right half in the drawing; and a spring 123s constituted of a compression coil spring that urges the spool 123p toward the left-half position. The switching valve 123 includes: the first working oil chamber 123a to which the primary control pressure PSLP is input in the direction in which the spool 123p is pressed toward the right-half position; the second working oil chamber 123b to which the engagement pressure PSL1 is input in the direction in which the spool 123*p* is pressed toward the left-half position; and the third working oil chamber 123*c* to which the modulator pressure $P_{LPM2}$ is input in the direction in which the spool 123*p* is pressed toward the left-half position. The switching valve 123 also includes: the first input port 123*d* to which the primary pulley pressure is input; the second input port 123*e* to which the secondary pulley pressure is input; the third input port 123*f* and the fifth input port 123*h* to which the modulator pressure $P_{LPM2}$ is input; and the fourth input port 123*g* to which the engagement pressure PSL1 is input. The switching valve 123 further includes: a first output port 123*i* that communicates with the hydraulic servo 45; the second output port 123*j* which communicates with the third input port 24*f* of the lock-up pressure difference control valve 24; a third output port 123*k* that communicates with the input port 21*a* of the manual valve 21; and a drain port 123*m*.

The switching valve 123 is configured such that the first input port 123*d* is communicated with the first output port 123*i*, the fourth input port 123*g* is communicated with the third output port 123*k*, the second output port 123*j* is communicated with the drain port 123*m*, and the second input port 123*e*, the third input port 123*f*, and the fifth input port 123*h* are blocked when the spool 123*p* is in the normal state at the left-half position. Meanwhile, the switching valve 123 is configured such that the second input port 123*e* is communicated with the first output port 123*i*, the third input port 123*f* is communicated with the second output port 123*j*, the fifth input port 123*h* is communicated with the third output port 123*k*, and the first input port 123*d* and the fourth input port 123*g* are blocked when the spool 23*p* is in the failure state at the right-half position.

Next, operation of the hydraulic control device 112 for the automatic transmission 110 according to the embodiment will be described.

When the internal combustion engine is started, the line pressure PL and the secondary pressure Psec are generated, and the modulator pressure $P_{LPM2}$ is generated by the line pressure modulator valve 20. The modulator pressure $P_{LPM2}$ is supplied to the primary linear solenoid valve SLP and the switching valve 123. Further, the linear solenoid valve SL1 supplies the engagement pressure PSL1 to lock the switching valve 123 in the normal state, and supplies the engagement pressure PSL1 to the manual valve 21 as a source pressure.

When the shift position is switched from the P range to the D range, the engagement pressure PSL1 is output from the manual valve 21 as the forward range pressure PD, and supplied to the hydraulic servo 93. Here, in order to use the continuously variable speed change mechanism 4 from the beginning, the ECU 11 causes the primary linear solenoid valve SLP to output the primary control pressure PSLP and causes the primary pressure control valve 22 to regulate the primary pulley pressure and supply the primary pulley pressure to the hydraulic servo 45 for the primary pulley 41 via the switching valve 123. At this time, the primary control pressure PSLP is supplied to the first working oil chamber 123*a* of the switching valve 123. However, the engagement pressure PSL1 of the linear solenoid valve SL1 is concurrently supplied to the second working oil chamber 123*b* as a resisting pressure to lock the spool 123*p* in the normal state, and thus the spool 123*p* is not switched to the failure state. Therefore, switching of the switching valve 123 to the failure state is suppressed even if the primary control pressure PSLP is used in the high-pressure region. Thus, the primary control pressure PSLP, which is high, can be used to control the primary pulley pressure, which improves the speed change rate compared to a case where the high-pressure region cannot be used. The ECU 11 determines whether or not to engage the lock-up clutch 16 on the basis of the vehicle speed, the accelerator operation amount, or the like, and engages the lock-up clutch 16 by supplying the lock-up pressure PSLU, which is regulated by the linear solenoid valve SLU, to the lock-up pressure difference control valve 24 in the case where the ECU 11 has determined to engage the lock-up clutch 16.

Next, operation for a case where all the linear solenoid valves are subjected to a failure due to a complete wire break or the linear solenoid valve SL1 is subjected to an off failure for some reason, for example, will be described. In this case, since the linear solenoid valve SL1 is of a normally closed type, the first clutch C1 cannot be engaged, and the vehicle cannot travel forward in this state.

Here, the linear solenoid valve SL1 is of a normally closed type, and thus cannot output the engagement pressure PSL1. Thus, the switching valve 123 is not locked in the normal state since the engagement pressure PSL1 is not supplied. In contrast, the primary linear solenoid valve SLP (and the secondary linear solenoid valve) is of a normally open type, and thus can output the primary control pressure PSLP. The switching valve 123 is switched to the failure state since the primary control pressure PSLP is supplied. Consequently, the modulator pressure $P_{LPM2}$ is supplied as the forward range pressure PD to the first clutch C1 via the switching valve 123 and the manual valve 21 so that the first clutch C1 can be engaged.

With the switching valve 123 switched to the failure state, in addition, the secondary pulley pressure which has been reduced by the check valve 26 is supplied to the hydraulic servo 45 for the primary pulley 41. Consequently, the continuously variable speed change mechanism 4 can be actuated, a drive force can be secured, and the vehicle can travel forward utilizing the power transfer path b.

Next, operation for a case where the primary linear solenoid valve SLP alone is subjected to an off failure, for example, will be described. In this case, the primary control pressure PSLP which is output from the primary linear solenoid valve SLP cannot be controlled, and in this state, speed change cannot be made by the continuously variable speed change mechanism 4. Here, the ECU 11 stops the linear solenoid valve SL1, and switches the switching valve 123 to the failure state using the primary control pressure PSLP. Consequently, the secondary pulley pressure from the secondary pressure control valve 25 is reduced by the check valve 26, and supplied to the hydraulic servo 45 for the primary pulley 41 via the switching valve 123. Therefore, the ECU 11 can regulate the holding force of the primary pulley 41 by regulating the secondary control pressure PSLS, securing a drive force. With the switching valve 123 switched to the failure state, in addition, the modulator pressure $P_{LPM2}$ is supplied to the first clutch C1 via the switching valve 123 and the manual valve 21 so that the first clutch C1 can be engaged. Therefore, even if the linear solenoid valve SL1 is stopped, the first clutch C1 can be engaged so that the vehicle can travel forward utilizing the power transfer path b.

Next, operation for a case where the linear solenoid valve SLU which regulates the lock-up pressure PSLU is subjected to an on failure, for example, will be described. In this case, the lock-up pressure difference control valve 24 is switched to the lock-up on state, and in this state, the lock-up clutch 16 will become uncontrollable while being kept engaged. Here, the ECU 11 stops the linear solenoid valve SL1, and switches the switching valve 123 to the failure state using the primary control pressure PSLP. Consequently, the modulator pressure $P_{LPM2}$ is supplied to the lock-up pressure difference control valve 24 via the switching valve 123 to act as a resisting pressure against the lock-up pressure PSLU. Therefore, the ECU 11 can disengage the lock-up clutch 16, securing disengagement. With the switching valve 123 switched to the failure state, in addition, the modulator pressure $P_{LPM2}$ is supplied to the first clutch C1 via the switching valve 123 and the manual valve 21 so that the first clutch C1 can be engaged. Therefore, even if the linear solenoid valve SL1 is stopped, the first clutch C1 can be engaged so that the vehicle can travel forward utilizing the power transfer path b.

With the hydraulic control device 112 for the automatic transmission 110 according to the embodiment, as has been described above, the engagement pressure PSL1 of the linear solenoid valve SL1 is supplied to the second working oil chamber 123b of the switching valve 123 so that the spool 123p is locked in the normal state and the primary control pressure PSLP can regulate the belt holding force of the primary pulley 41 without changing the position of the spool 123p. That is, not only the low-pressure region but also the high-pressure region of the primary control pressure PSLP can be utilized to regulate the belt holding force, and thus the speed change rate of the continuously variable speed change mechanism 4 can be improved.

With the hydraulic control device 112 for the automatic transmission 110 according to the embodiment, in addition, the engagement pressure PSL1 is not supplied to the second working oil chamber 123b so that the spool 123p is not locked in the normal state and the primary control pressure PSLP can switch the spool 123p to the failure state against the spring 123s. Therefore, the switching valve 123 can be switched to the failure state using the primary control pressure PSLP as a signal pressure. Consequently, outputting the primary control pressure PSLP can switch the switching valve 123 to the failure state in the case where the linear solenoid valves are subjected to a complete wire break or the linear solenoid valve SL1 is subjected to an off failure, for example. Alternatively, stopping operation of the linear solenoid valve SL1 and outputting the primary control pressure PSLP can switch the switching valve 123 to the failure state in the case where the primary linear solenoid valve SLP is subjected to an off failure or the linear solenoid valve SLU is subjected to an on failure.

In the hydraulic control device 112 for the automatic transmission 110 according to the embodiment, in addition, the automatic transmission 110 includes the first clutch C1 which forms a path for transferring rotation in the forward direction of the vehicle 1 when the first clutch C1 is engaged, and the first brake B1 which forms a path for transferring rotation in the reverse direction of the vehicle 1 when the first brake B1 is engaged; and the engagement element is the first clutch C1.

Therefore, with the hydraulic control device 112 for the automatic transmission 110 according to the embodiment, one power transfer path b is provided, and the speed change rate of the continuously variable speed change mechanism 4 of the automatic transmission 10 with four axes which is switched between forward travel and reverse travel by only the first clutch C1 and the first brake B1 can be improved.

In the embodiment discussed above, the first clutch C1 is applied as the engagement element. However, the present disclosure is not limited thereto, and the first brake B1 may be applied as the engagement element.

Third Embodiment

Next, a hydraulic control device 212 for an automatic transmission 110 according to a third embodiment will be described with reference to FIG. 7. The automatic transmission 110 according to the embodiment is similar in configuration to the automatic transmission 110 according to the second embodiment, and thus will not be described in detail with the aid of the drawings.

Figure 7:
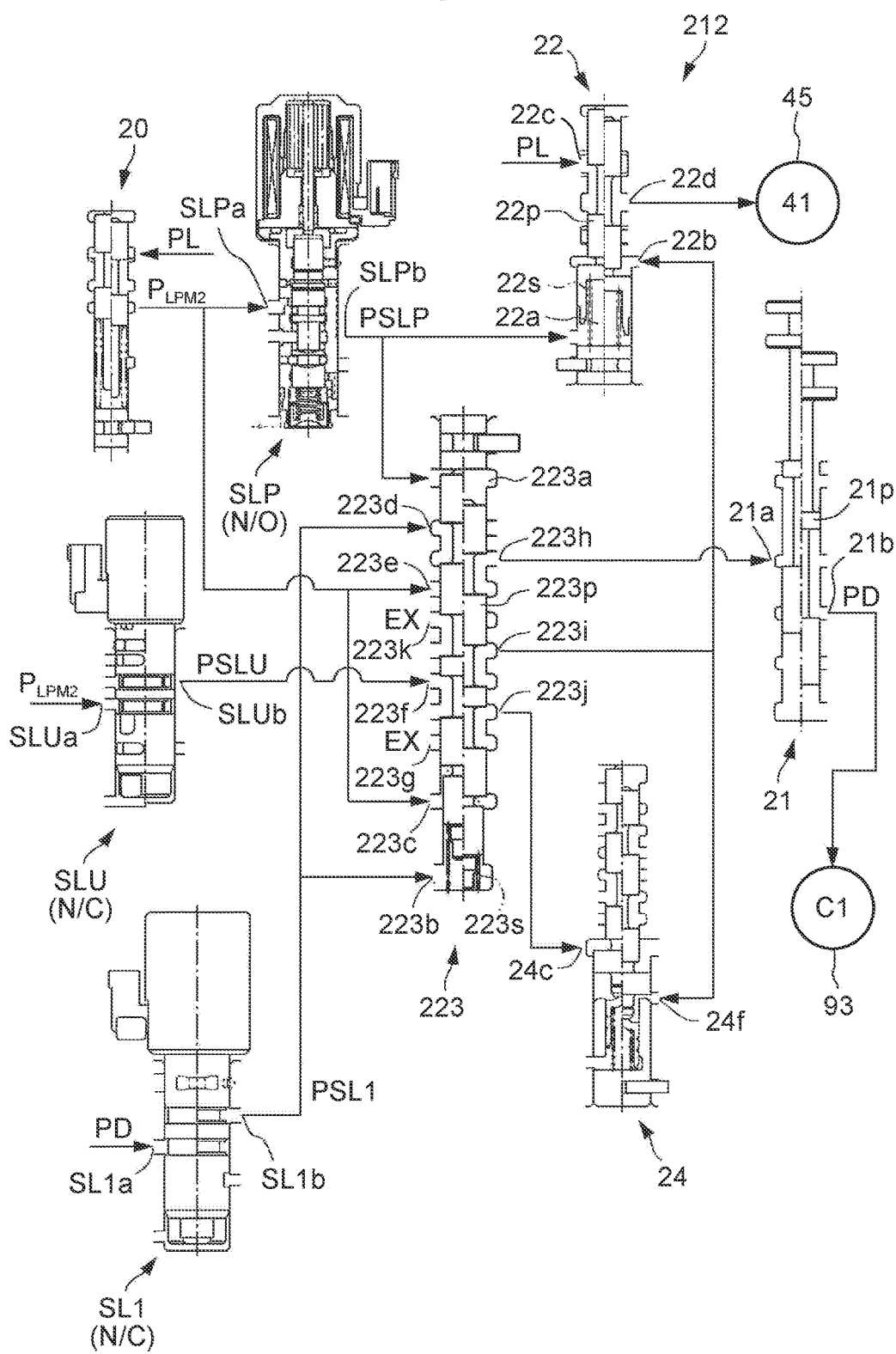
FIG. 7 is a hydraulic circuit diagram illustrating a hydraulic control device according to a third embodiment.

As illustrated in FIG. 7, the hydraulic control device 212 according to the embodiment includes the line pressure modulator valve (source pressure supply section) 20, the primary linear solenoid valve SLP, the primary pressure control valve 22, the linear solenoid valve SLU, the linear solenoid valve (solenoid valve) SL1, the manual valve 21, the lock-up pressure difference control valve 24, a switching valve (fail-safe valve) 223, and so forth.

The line pressure modulator valve 20 supplies the modulator pressure (source pressure) $P_{LPM2}$ to the input port SLPa of the primary linear solenoid valve SLP and a second input port 223e and a third working oil chamber 223c of the switching valve 223 to be discussed later. The primary linear solenoid valve SLP supplies the primary control pressure PSLP to the first working oil chamber 22a of the primary pressure control valve 22 and a first working oil chamber 223a of the switching valve 223. The primary pressure control valve 22 supplies the primary pulley pressure to the hydraulic servo 45 for the primary pulley 41.

The linear solenoid valve SLU includes: an input port SLUa to which the modulator pressure $P_{LPM2}$ is input; and an output port SLUb that communicates with a third input port 223f of the switching valve 223. The linear solenoid valve SLU can regulate the input modulator pressure $P_{LPM2}$, to generate the lock-up pressure PSLU for engaging and disengaging the lock-up clutch 16 (see FIG. 3), and to supply the lock-up pressure PSLU from the output port SLUb. The linear solenoid valve SLU is of a normally closed type which does not output a hydraulic pressure when not energized.

The linear solenoid valve SL1 includes: the input port SL1a to which the forward range pressure PD is input; and the output port SL1b which communicates with a second working oil chamber 223b and a first input port 223d of the switching valve 223. The linear solenoid valve SL1 can regulate the input forward range pressure PD, to generate the engagement pressure PSL1 to be supplied to the hydraulic servo 93, and to supply the engagement pressure PSL1 from the output port SL1b. The linear solenoid valve SL1 is of a normally closed type which does not output a hydraulic pressure when not energized.

The manual valve 21 includes: the spool 21p; the input port 21a to which the engagement pressure PSL1 or the modulator pressure $P_{LPM2}$ is input; and the output port 21b which outputs the engagement pressure PSL1 or the modulator pressure $P_{LPM2}$ as the forward range pressure PD in the case where the spool 21p is at the D range position.

The lock-up pressure difference control valve 24 includes: the third working oil chamber 24c to which the lock-up pressure PSLU can be supplied via the switching valve 223 in the direction in which the spool 24p (see FIG. 3) is pressed toward the right-half position; and the third input port 24f which communicates with a second output port 223i of the switching valve 223. The lock-up pressure difference control valve 24 regulates the lock-up pressure PSLU to control the state of engagement of the lock-up clutch 16 (see FIG. 3).

The switching valve 223, which is the characteristic portion of the embodiment, includes: a spool 223p that can be switched between a position (normal state, first position) indicated in the left half in the drawing and a position (failure state, second position) indicated in the right half in the drawing; and a spring 223s constituted of a compression coil spring that urges the spool 223p toward the left-half position. The switching valve 223 includes: the first working oil chamber 223a to which the primary control pressure PSLP is input in the direction in which the spool 223p is pressed toward the right-half position; the second working oil chamber 223b to which the engagement pressure PSL1 is input in the direction in which the spool 223p is pressed toward the left-half position; and the third working oil chamber 223c to which the modulator pressure $P_{LPM2}$ is input in the direction in which the spool 223p is pressed toward the left-half position.

The switching valve 223 also includes: the first input port 223d to which the engagement pressure PSL1 is input; the second input port 223e to which the modulator pressure $P_{LPM2}$ is input; and the third input port 223f to which the lock-up pressure PSLU is input. The switching valve 223 further includes: a first output port 223h that communicates with the input port 21a of the manual valve 21; the second output port 223i which communicates with the second working oil chamber 22b of the primary pressure control valve 22 and the third input port 24f of the lock-up pressure difference control valve 24; a third output port 223j that communicates with the third working oil chamber 24c of the lock-up pressure difference control valve 24; and drain ports 223k and 223g.

The switching valve 223 is configured such that the first input port 223d is communicated with the first output port 223h, the third input port 223f is communicated with the third output port 223j, the second output port 223i is drained, and the second input port 223e is blocked when the spool 223p is in the normal state at the left-half position. Meanwhile, the switching valve 223 is configured such that the second input port 223e is communicated with the first output port 223h, the third input port 223f is communicated with the second output port 223i, the third output port 223j is communicated with the drain port 223g, and the first input port 223d is blocked when the spool 223p is in the failure state at the right-half position.

Next, operation of the hydraulic control device 212 for the automatic transmission 110 according to the embodiment will be described.

When the internal combustion engine is started, the line pressure PL and the secondary pressure Psec are generated, and the modulator pressure $P_{LPM2}$ is generated by the line pressure modulator valve 20. The modulator pressure $P_{LPM2}$ is supplied to the primary linear solenoid valve SLP and the switching valve 223. Further, the linear solenoid valve SL1 supplies the engagement pressure PSL1 to lock the switching valve 123 in the normal state, and supplies the engagement pressure PSL1 to the manual valve 21 as a source pressure.

When the shift position is switched from the P range to the D range, the engagement pressure PSL1 is output from the manual valve 21 as the forward range pressure PD, and supplied to the hydraulic servo 93. In order to use the continuously variable speed change mechanism 4 from the beginning, the ECU 11 causes the primary linear solenoid valve SLP to output the primary control pressure PSLP and causes the primary pressure control valve 22 to regulate the primary pulley pressure and supply the primary pulley pressure to the hydraulic servo 45 for the primary pulley 41. At this time, the primary control pressure PSLP is supplied to the first working oil chamber 223a of the switching valve 223. However, the engagement pressure PSL1 of the linear solenoid valve SL1 is concurrently supplied to the second working oil chamber 223b as a resisting pressure to lock the spool 223p in the normal state, and thus the spool 223p is not switched to the failure state. Therefore, switching of the switching valve 223 to the failure state is suppressed even if the primary control pressure PSLP is used in the high-pressure region. Thus, the primary control pressure PSLP, which is high, can be used to control the primary pulley pressure, which improves the speed change rate compared to a case where the high-pressure region cannot be used. The ECU 11 determines whether or not to engage the lock-up clutch 16 on the basis of the vehicle speed, the accelerator operation amount, or the like, and engages the lock-up clutch 16 by supplying the lock-up pressure PSLU, which is regulated by the linear solenoid valve SLU, to the lock-up pressure difference control valve 24 in the case where the ECU 11 has determined to engage the lock-up clutch 16.

Next, operation for a case where all the linear solenoid valves are subjected to a failure due to a complete wire break or the linear solenoid valve SL1 is subjected to an off failure for some reason, for example, will be described. In this case, since the linear solenoid valve SL1 is of a normally closed type, the first clutch C1 cannot be engaged, and the vehicle cannot travel forward in this state.

Here, the linear solenoid valve SL1 is of a normally closed type, and thus cannot output the engagement pressure PSL1. Thus, the switching valve 223 is not locked in the normal state since the engagement pressure PSL1 is not supplied. In contrast, the primary linear solenoid valve SLP (and the secondary linear solenoid valve) is of a normally open type, and thus can output the primary control pressure PSLP. The switching valve 223 is switched to the failure state since the primary control pressure PSLP is supplied. Consequently, the modulator pressure $P_{LPM2}$ is supplied as the forward range pressure PD to the first clutch C1 via the switching valve 223 and the manual valve 21 so that the first clutch C1 can be engaged. Since the primary control pressure PSLP and the secondary control pressure can be supplied, in addition, the continuously variable speed change mechanism 4 can be actuated, which allows the vehicle to travel forward utilizing the power transfer path b.

Next, operation for a case where the primary linear solenoid valve SLP alone is subjected to an off failure, for example, will be described. In this case, the primary control pressure PSLP which is output from the primary linear solenoid valve SLP cannot be controlled, and in this state, speed change cannot be made by the continuously variable speed change mechanism 4. Here, the ECU 11 stops the linear solenoid valve SL1, and switches the switching valve 223 to the failure state using the primary control pressure PSLP. Consequently, the lock-up pressure PSLU from the linear solenoid valve SLU is supplied to the primary pressure control valve 22 via the switching valve 223 to act as a resisting pressure against the primary control pressure PSLP. Therefore, the ECU 11 can regulate the primary pulley pressure by regulating the lock-up pressure PSLU, securing a drive force. With the switching valve 223 switched to the failure state, in addition, the modulator pressure $P_{LPM2}$ is supplied to the first clutch C1 via the switching valve 223 and the manual valve 21 so that the first clutch C1 can be engaged. Therefore, even if the linear solenoid valve SL1 is stopped, the first clutch C1 can be engaged so that the vehicle can travel forward utilizing the power transfer path b.

Next, operation for a case where the linear solenoid valve SLU which regulates the lock-up pressure PSLU is subjected to an on failure, for example, will be described. In this case, the lock-up pressure difference control valve 24 is switched to the lock-up on state, and in this state, the lock-up clutch 16 will become uncontrollable while being kept engaged. Here, the ECU 11 stops the linear solenoid valve SL1, and switches the switching valve 223 to the failure state using the primary control pressure PSLP. Supply of the lock-up pressure PSLU is switched by the switching valve 223 so that the lock-up pressure PSLU is supplied to the third input port 24f of the lock-up pressure difference control valve 24. Therefore, the ECU 11 can disengage the lock-up clutch 16, securing disengagement. With the switching valve 223 switched to the failure state, in addition, the modulator pressure $P_{LPM2}$ is supplied to the first clutch C1 via the switching valve 223 and the manual valve 21 so that the first clutch C1 can be engaged. Therefore, even if the linear solenoid valve SL1 is stopped, the first clutch C1 can be engaged so that the vehicle can travel forward utilizing the power transfer path b.

With the hydraulic control device 212 for the automatic transmission 110 according to the embodiment, as has been described above, the engagement pressure PSL1 of the linear solenoid valve SL1 is supplied to the second working oil chamber 223b of the switching valve 223 so that the spool 223p is locked in the normal state and the primary control pressure PSLP can regulate the belt holding force of the primary pulley 41 without changing the position of the spool 223p. That is, not only the low-pressure region but also the high-pressure region of the primary control pressure PSLP can be utilized to regulate the belt holding force, and thus the speed change rate of the continuously variable speed change mechanism 4 can be improved.

With the hydraulic control device 212 for the automatic transmission 110 according to the embodiment, in addition, the engagement pressure PSL1 is not supplied to the second working oil chamber 223b so that the spool 223p is not locked in the normal state and the primary control pressure PSLP can switch the spool 223p to the failure state against the spring 223s. Therefore, the switching valve 223 can be switched to the failure state using the primary control pressure PSLP as a signal pressure. Consequently, outputting the primary control pressure PSLP can switch the switching valve 223 to the failure state in the case where the linear solenoid valves are subjected to a complete wire break or the linear solenoid valve SL1 is subjected to an off failure, for example. Alternatively, stopping operation of the linear solenoid valve SL1 and outputting the primary control pressure PSLP can switch the switching valve 223 to the failure state in the case where the primary linear solenoid valve SLP is subjected to an off failure or the linear solenoid valve SLU is subjected to an on failure.

INDUSTRIAL APPLICABILITY

The hydraulic control device for an automatic transmission relates to a hydraulic control device for an automatic transmission that includes a continuously variable speed change mechanism mounted on a vehicle, for example, and is particularly suitable for use as a hydraulic control device for an automatic transmission that has a fail-safe function.

The invention claimed is:

1. A hydraulic control device for an automatic transmission, comprising:
    an input shaft drivably coupled to a drive source of a vehicle;
    a driving shaft drivably coupled to wheels;
    a continuously variable speed change mechanism that has a primary pulley, a secondary pulley, and a belt held between the primary pulley and the secondary pulley and that is capable of continuously changing a speed ratio between the input shaft and the driving shaft by controlling pulley widths of the primary pulley and the secondary pulley;
    an engagement element provided in a power transfer path that couples the input shaft and the driving shaft via the continuously variable speed change mechanism;
    a primary solenoid valve that supplies a primary control pressure for regulating a belt holding force of the primary pulley of the continuously variable speed change mechanism;
    a secondary solenoid valve that supplies a secondary control pressure for regulating a belt holding force of the secondary pulley of the continuously variable speed change mechanism;
    a solenoid valve that supplies an engagement pressure for the engagement element; and
    a switching valve that has a spool that is switchable between a first position and a second position, an urging member that urges the spool toward the first position, a first working oil chamber that is supplied with a switching pressure, which is the primary control pressure or the secondary control pressure, to press the spool toward the second position, and a second working oil chamber that is supplied with the engagement pressure to press the spool toward the first position, wherein
    the spool is locked at the first position and the switching pressure can regulate the belt holding force of the primary pulley or the secondary pulley without switching a position of the spool when the engagement pressure is supplied to the second working oil chamber, and the spool is not locked at the first position and the switching pressure can switch the spool to the second position against the urging member when the engagement pressure is not supplied to the second working oil chamber.

2. The hydraulic control device for an automatic transmission according to claim 1, further comprising:
    a source pressure supply section that supplies a source pressure, wherein
    the switching valve is a fail-safe valve that is brought into a normal state, in which the engagement pressure is supplied to the engagement element, at the first position, and that is brought into a failure state, in which the source pressure is supplied to the engagement element, at the second position.

3. The hydraulic control device for an automatic transmission according to claim 1 or 2, characterized in that: claim 2, wherein:
    the automatic transmission includes
        a forward/reverse switching device that has a first forward engagement element that forms a path through which rotation in a forward direction of the vehicle is transferred when the first forward engagement element is engaged, and a reverse engagement element that forms a path through which rotation in a reverse direction of the vehicle is transferred when the reverse engagement element is engaged,
        a synchronization mechanism provided in a first power transfer path that couples the input shaft and the driving shaft to each other via the forward/reverse switching device, and
        a second forward engagement element provided in a second power transfer path that couples the input shaft and the driving shaft to each other via the continuously variable speed change mechanism; and the engagement element is the second forward engagement element.

4. The hydraulic control device for an automatic transmission according to claim 2, wherein:
the automatic transmission includes a forward/reverse switching device that has a forward engagement element that forms a path through which rotation in a forward direction of the vehicle is transferred when the forward engagement element is engaged, and a reverse engagement element that forms a path through which rotation in a reverse direction of the vehicle is transferred when the reverse engagement element is engaged; and
the engagement element is the forward engagement element or the reverse engagement element.

5. The hydraulic control device for an automatic transmission according to claim 4, wherein:
a control pressure solenoid valve is of a normally open type which outputs the engagement pressure when not energized.

6. The hydraulic control device for an automatic transmission according to claim 5, wherein:
the switching pressure is the primary control pressure.

7. The hydraulic control device for an automatic transmission according to claim 6, wherein:
the solenoid valve is of a normally closed type which does not output the engagement pressure when not energized.

8. The hydraulic control device for an automatic transmission according to claim 1, wherein:
the automatic transmission includes
a forward/reverse switching device that has a first forward engagement element that forms a path through which rotation in a forward direction of the vehicle is transferred when the first forward engagement element is engaged, and a reverse engagement element that forms a path through which rotation in a reverse direction of the vehicle is transferred when the reverse engagement element is engaged,
a synchronization mechanism provided in a first power transfer path that couples the input shaft and the driving shaft to each other via the forward/reverse switching device, and
a second forward engagement element provided in a second power transfer path that couples the input shaft and the driving shaft to each other via the continuously variable speed change mechanism; and
the engagement element is the second forward engagement element.

9. The hydraulic control device for an automatic transmission according to claim 1, wherein:
the automatic transmission includes a forward/reverse switching device that has a forward engagement element that forms a path through which rotation in a forward direction of the vehicle is transferred when the forward engagement element is engaged, and a reverse engagement element that forms a path through which rotation in a reverse direction of the vehicle is transferred when the reverse engagement element is engaged; and
the engagement element is the forward engagement element or the reverse engagement element.

10. The hydraulic control device for an automatic transmission according to claim 1, wherein:
a control pressure solenoid valve is of a normally open type which outputs the engagement pressure when not energized.

11. The hydraulic control device for an automatic transmission according to claim 1, wherein:
the switching pressure is the primary control pressure.

12. The hydraulic control device for an automatic transmission according to claim 1, wherein:
the solenoid valve is of a normally closed type which does not output the engagement pressure when not energized.

13. The hydraulic control device for an automatic transmission according to claim 3, wherein:
a control pressure solenoid valve is of a normally open type which outputs the engagement pressure when not energized.

14. The hydraulic control device for an automatic transmission according to claim 2, wherein:
a control pressure solenoid valve is of a normally open type which outputs the engagement pressure when not energized.

15. The hydraulic control device for an automatic transmission according to claim 8, wherein:
a control pressure solenoid valve is of a normally open type which outputs the engagement pressure when not energized.

16. The hydraulic control device for an automatic transmission according to claim 9, wherein:
a control pressure solenoid valve is of a normally open type which outputs the engagement pressure when not energized.

17. The hydraulic control device for an automatic transmission according to claim 2, wherein:
the switching pressure is the primary control pressure.

18. The hydraulic control device for an automatic transmission according to claim 2, wherein:
the solenoid valve is of a normally closed type which does not output the engagement pressure when not energized.

19. The hydraulic control device for an automatic transmission according to claim 8, wherein:
the switching pressure is the primary control pressure.

20. The hydraulic control device for an automatic transmission according to claim 8, wherein:
the solenoid valve is of a normally closed type which does not output the engagement pressure when not energized.

* * * * *